United States Patent
Lal et al.

(10) Patent No.: US 10,285,237 B2
(45) Date of Patent: May 7, 2019

(54) ADVANCED LIGHT EMITTING DIODE LUMINAIRE

(71) Applicant: Purillume, Inc., Cary, NC (US)

(72) Inventors: Neeraj Lal, Cary, NC (US); Randy Faucette, Cary, NC (US); Quinn Marceil, Raleigh, NC (US); Rodney Bame, Cary, NC (US)

(73) Assignee: Purillume, Inc., Cary, NC (US)

(*) Notice: Subject to any disclaimer, the term of this patent is extended or adjusted under 35 U.S.C. 154(b) by 0 days.

(21) Appl. No.: 14/941,425

(22) Filed: Nov. 13, 2015

(65) Prior Publication Data

US 2016/0143109 A1 May 19, 2016

Related U.S. Application Data (60) Provisional application No. 62/243,586, filed on Oct. 19, 2015, provisional application No. 62/123,332, filed on Nov. 14, 2014.

(51) Int. Cl.

| | |
|---|---|
| *H05B 33/08* | (2006.01) |
| *F21V 29/70* | (2015.01) |
| *H05B 37/02* | (2006.01) |
| *F21S 6/00* | (2006.01) |
| *F21Y 115/10* | (2016.01) |
| *F21V 23/04* | (2006.01) |
| *F21S 10/02* | (2006.01) |
| *F21Y 113/13* | (2016.01) |

(52) U.S. Cl.
CPC .......... *H05B 33/0863* (2013.01); *F21S 6/002* (2013.01); *F21V 29/70* (2015.01); *H05B 33/0845* (2013.01); *H05B 37/0272* (2013.01); *H05B 37/0281* (2013.01); *F21S 10/023* (2013.01); *F21V 23/0492* (2013.01); *F21Y 2113/13* (2016.08); *F21Y 2115/10* (2016.08)

(58) Field of Classification Search
CPC ............ H05B 33/0863; H05B 33/0845; H05B 37/0272; H05B 37/0281; F21V 29/70; F21Y 2101/00
USPC ........... 362/235–248, 249.01–249.09, 249.1, 362/249.11–249.19, 253–256; 315/294
See application file for complete search history.

(56) References Cited

U.S. PATENT DOCUMENTS

| | | | | |
|---|---|---|---|---|
| 2009/0207607 | A1* | 8/2009 | Haase | F21V 33/0056 362/234 |
| 2011/0170291 | A1* | 7/2011 | Simon | F21S 6/004 362/241 |
| 2011/0204778 | A1* | 8/2011 | Sadwick | H05B 33/0827 315/34 |

(Continued)

OTHER PUBLICATIONS

International Search Report dated Nov. 3, 2016, issued in International Application No. PCT/US2015/060732 filed Nov. 13, 2015, inventor, Lal, Neeraj et al.

*Primary Examiner* — Seokjin Kim
(74) *Attorney, Agent, or Firm* — Steptoe & Johnson LLP (57) ABSTRACT

An advance light emitting diode luminaire is disclosed. According to one embodiment, an apparatus comprises a first LED array, wherein the first LED array outputs first light in a downward direction. The apparatus includes a second LED array, wherein the second LED array outputs second light in an upward direction. The apparatus further comprises a harp between the first LED array and the second LED array.

10 Claims, 9 Drawing Sheets

(56) References Cited

U.S. PATENT DOCUMENTS

| | | | |
|---|---|---|---|
| 2011/0291588 A1* | 12/2011 | Tagare | H05B 33/0803 |
| | | | 315/294 |
| 2012/0281403 A1* | 11/2012 | Kang | F21V 3/00 |
| | | | 362/237 |
| 2013/0063935 A1* | 3/2013 | Thrailkill | F21V 29/004 |
| | | | 362/231 |
| 2013/0154488 A1 | 6/2013 | Sadwick et al. | |
| 2014/0078723 A1 | 3/2014 | Chen et al. | |
| 2014/0244997 A1 | 8/2014 | Goel et al. | |
| 2015/0204561 A1* | 7/2015 | Sadwick | F24F 11/006 |
| | | | 236/1 C |

* cited by examiner

ADVANCED LIGHT EMITTING DIODE LUMINAIRE

CROSS REFERENCE TO RELATED APPLICATIONS

The present disclosure claims the benefit of U.S. Provisional Patent Application No. 62/123,332 entitled "LED Lamp" filed on Nov. 14, 2014 and U.S. Provisional Patent Application No. 62/243,586 entitled "Advanced LED Lamp" filed on Oct. 19, 2015, both hereby incorporated by reference.

FIELD

The present disclosure generally relates to lighting systems, and more particularly, to an advanced light emitting diode luminaire.

BACKGROUND

Light emitting diodes (LEDs) possess several advantages over traditional incandescent and fluorescent bulbs, such as long life, energy savings and fast start-up times. LEDs continue to expand in their applications including traffic signals, big advertising billboards, transports, flashlights and general illumination. Table and floor lamps today, however, are still largely designed for traditional incandescent and fluorescent bulbs. A majority of LED retrofit bulb replacement products provide an inferior light quality (color rendering) and light emission pattern.

SUMMARY

An advance light emitting diode luminaire is disclosed. According to one embodiment, an apparatus comprises a first LED array, wherein the first LED array outputs first light in a downward direction. The apparatus includes a second LED array, wherein the second LED array outputs second light in an upward direction. The apparatus further comprises a harp between the first LED array and the second LED array.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTIONS OF DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

An advance light emitting diode luminaire is disclosed. According to one embodiment, an apparatus comprises a first LED array, wherein the first LED array outputs first light in a downward direction. The apparatus includes a second LED array, wherein the second LED array outputs second light in an upward direction. The apparatus further comprises a harp between the first LED array and the second LED array.

According to one embodiment, the luminaire is a solid state lighting table lamp with a light source that provide high luminous output and a high color rendering index to provide a high quality of light. The light source includes white LEDs at different color temperatures and blue LEDs to create a range of color temperatures for a user selectable customized light output.

The light source has a color-changing element, implemented through clusters of LEDs at different correlated color temperatures (CCTs), according to one embodiment. This allows the end-user to customize the light for his or her needs or preference. The luminaire features an integrated night-light and a tilt sensor with auto dimming for safety. The luminaire can be controlled via a wall switch, through a mobile application and/or through a display on the lamp itself. The luminaire can communicate with other luminaires in the room or on a secure network (e.g., home network, zigbee or bluetooth wireless standard) to maintain a consistent color temperature across synchronized luminaires and provide a pleasant environment for the end-user.

According to another embodiment, the luminaire includes a shade with a light source that outputs an omnidirectional light in an up-down configuration. According to one embodiment, the up-down configuration utilizes a lamp harp. The light source for the luminaire provides an omnidirectional light distribution that replicates the light output of a traditional incandescent bulb in a lamp socket with a shade. According to one embodiment, the light source is incorporated into the harp design. The harp may be used with a traditional lamp shade. The luminaire has the ability to deliver a much brighter light source than traditional LED replacement bulbs.

The luminaire may be any luminaire, including but not limited to a table lamp, a floor lamp, a sconce, ceiling light or a chandelier. According to one embodiment, the luminaire provides a high quality of light at a high luminous output (that is dimmable) to enhance an end-user's experience within an indoor environment. The present luminaire may be deployed anywhere including, but not limited to, hospitality, residential and senior living environments.

Figure 1:
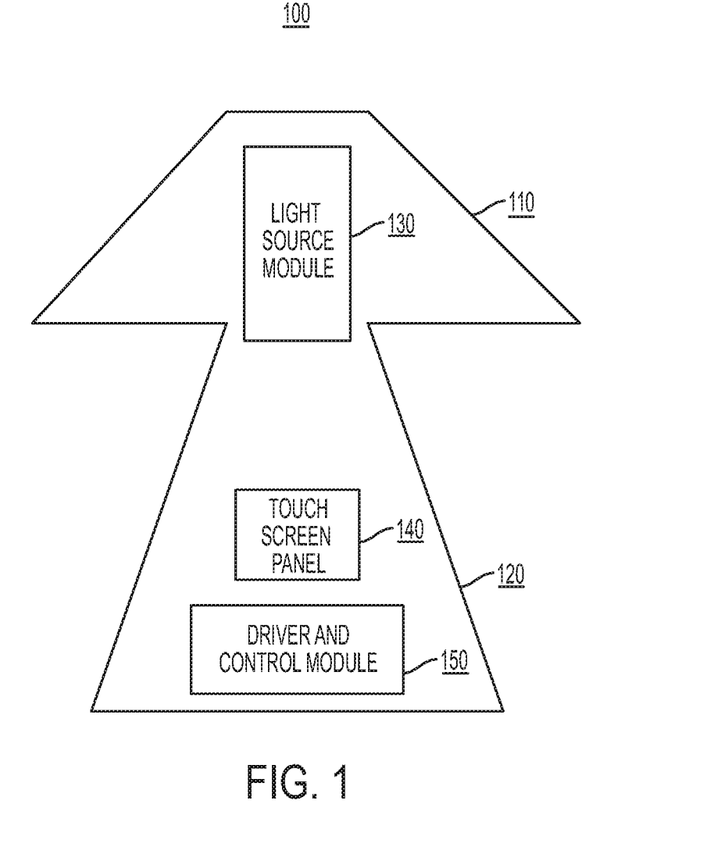
FIG. 1 illustrates an exemplary advanced LED luminaire, according to one embodiment.

FIG. 1 illustrates an exemplary advanced LED luminaire, according to one embodiment. Luminaire 100 includes a shade 110, a luminaire body 120, a light source module 130, a touch screen panel 140, and a driver and control module 150. Shade 100 may be any standard lighting shade made from cloth, plastic, or other translucent or non-translucent material. Luminaire body 120 may include a touch screen panel 140, driver and control module 150, and any additional electronics components used by the present luminaire. In alternate embodiments, touch screen panel 140, driver and control module 150, and any additional electronics components are not within luminaire body 120 (e.g., in a separate enclosure that is not attached to the luminaire 100, in a separate enclosure that is attached to the luminaire 100 as a base to luminaire body 120, or within the lamp shade 110, or the components are divided between different locations.) Light source module 130 includes one or more LED light sources mounted to a harp. The harp interconnects the lamp shade 110 to the luminaire body 120. The harp is described in greater detail below.

Figure 2:
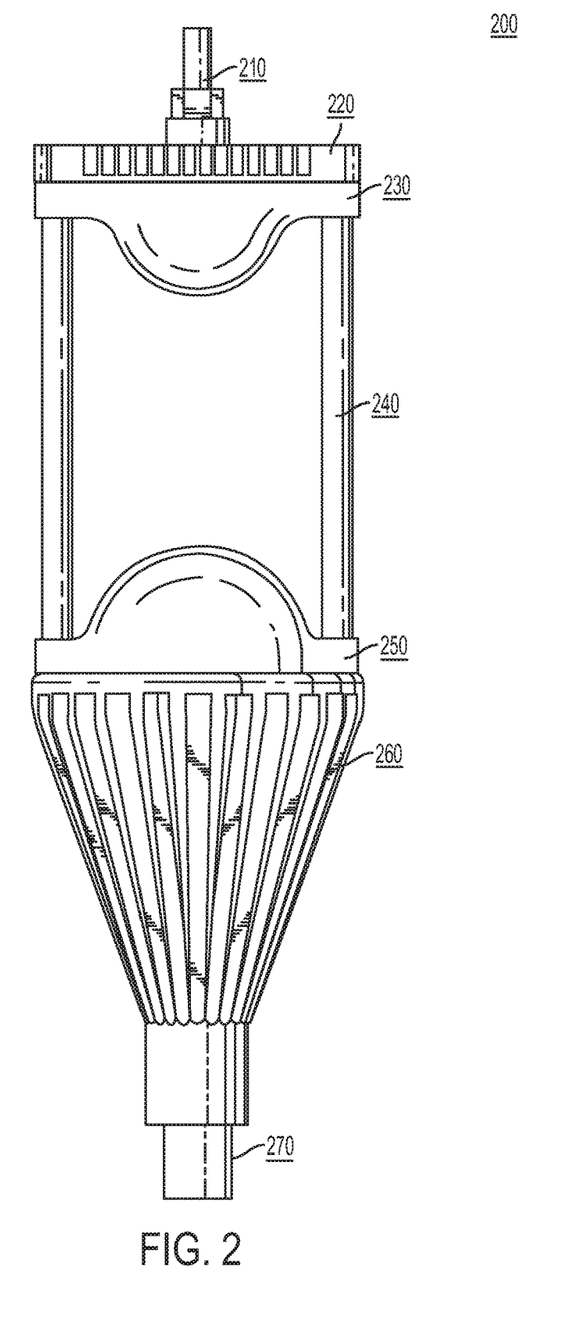
FIG. 2 illustrates exemplary lighting components of an exemplary light source module, according to one embodiment.

FIG. 2 illustrates exemplary lighting components of an exemplary light source module, according to one embodiment. Lighting components 200 includes lamp shade mount 210, upper heat sink 220, upper diffuser and LED array 230, harp 240, lower diffuser and LED array 250, lower heat sink 260, and base mount 270.

Lamp shade mount 210 allows for any standard light shade with a spider/reflector/harp fitter to be used with luminaire 100. A lamp shade 110 may be attached to lamp shade mount 210 using a decorative nut or finial (not shown).

Upper heat sink 220 conducts heat from upper diffuser and LED array 230. According to one embodiment, upper heat sink 220 mounts on top of harp 240 and has the same footprint as the upper diffuser and LED array 230.

The upper diffuser and LED array 230 provides lower intensity illumination than the lower diffuser and LED array 250. It delivers the overall omnidirectional light output and emulates the look and feel of a traditional incandescent light bulb solution. According to one embodiment, upper diffuser and LED array 230 has two blue LEDs, four white LEDs (with different CCTs). Due to the orientation and directionality of LEDs, upper diffuser and LED array 230 produces substantially more down light than a retrofit CFL or LED bulb. The upper diffuser and LED array 230 has the same channels (e.g., 321-324, 421-426) and color changing ability as the lower diffuser and LED array 250. The light can both dim and change color at the same rate as the lower diffuser and LED array 250 helping to maintain continuity in operation so the dimming and color changing ability remains in synchronization. The upper diffuser and LED array 230 is mounted on upper heat sink 220, according to one embodiment. The LEDs are mounted on an LED board within a diffuser (e.g., upper diffuser and LED array 230 and lower diffuser and LED array 250).

Harp 240 supports both the upper diffuser and LED array 230 and the lamp shade 110. The harp 240 includes a tube that allows an electrical connection to the upper diffuser and LED array 230. Connections from a lower LED board within lower diffuser and LED array 250 are passed through the tube to a upper LED board within upper diffuser and LED array 230. According to one embodiment, lower LED board includes multiple banks of LEDs, a temperature sensor and two connectors. One connector provides communications to the driver and control module 150 and the second connector provides signals to the upper LED board. The upper LED board includes a connector to communicate with the lower LED board and the driver and control module 150. The harp 240 also acts as an additional method to dissipate heat away from the LED sources (e.g., upper diffuser and LED array 230 and lower diffuser and LED array 250). The harp attaches to the lower and upper heat sinks (260 and 220) with fastener screws.

The lower diffuser and LED array 250 is the primary light source, according to one embodiment. According to one embodiment the lower diffuser and LED array 250 has ten blue, and twenty white LEDs (with different CCTs). The lower diffuser and LED array 250 is mounted on lower heat sink 260. The lower heat sink 260:
1. performs heat dissipation for the conducted heat of the LEDs within lower diffuser and LED array 250;
2. provides a mounting mechanism for the harp 240;
3. may be screwed on to any lamp body 120; and
4. provides an enclosed and secure wiring conduit for the LEDs within lower diffuser and LED array 250.

The lower diffuser and LED array 250 is a multi-channel white LED light source that changes colors from a cool white color temperature for illumination down to the standard incandescent warm white (2700K) mode and provides a warm dimming effect down to 2200K. Lower diffuser and LED array 250 also includes a blue LED for both circadian rhythm synchronization and to provide a cooler color temperature beyond 5000K. Upper diffuser and LED array 230 and lower diffuser and LED array 250 include light diffusers that spread the light emitted by the LEDs to mitigate shadowing from the individual LEDs. The light diffusers are acrylic in one embodiment. In alternate embodiments the diffuser is made of polycarbonate plastic material. The light diffusers help to protect the LED arrays and protect end-users from touching the hot electronic components. According to one embodiment, the light diffuser is molded and covers the LED board, as well as the electrical connection that runs through the harp 240.

Figure 3:
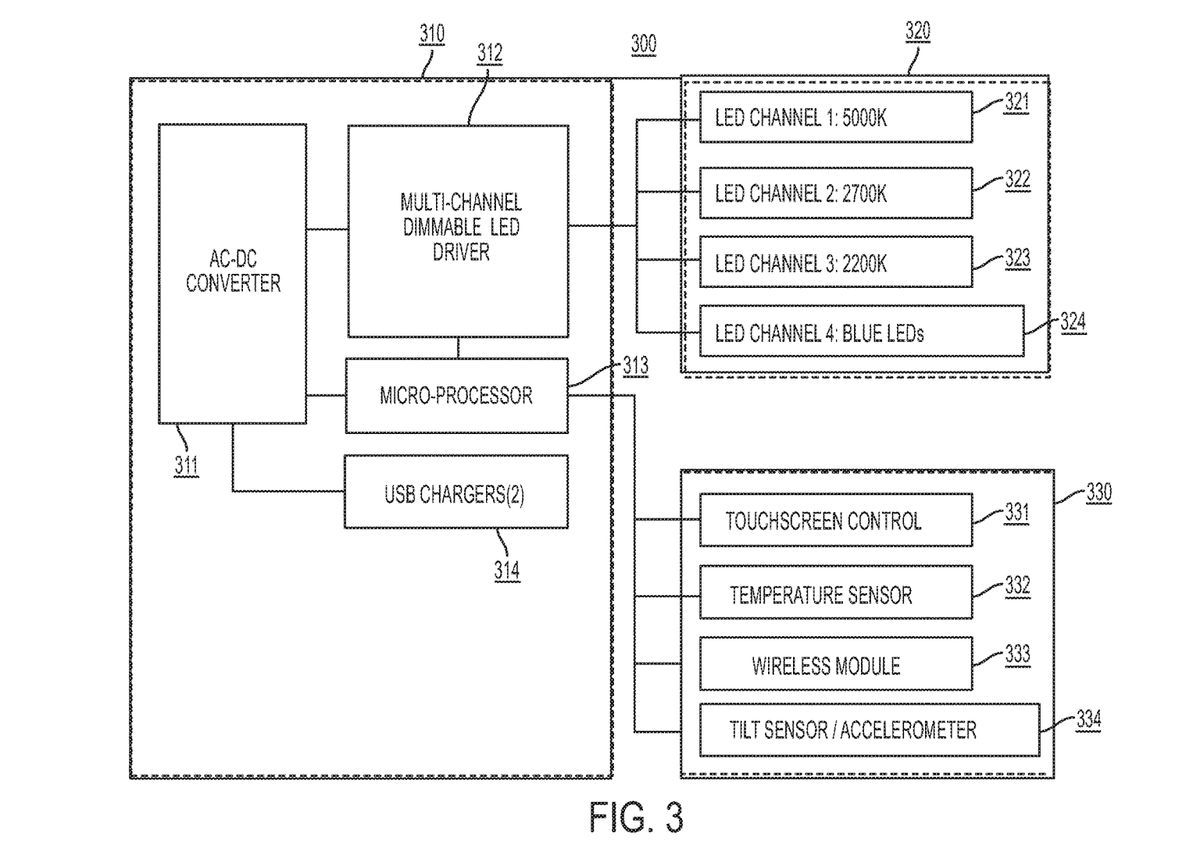
FIG. 3 illustrates an exemplary block diagram of electronic components for the present luminaire, according to one embodiment.

FIG. 3 illustrates an exemplary block diagram of electronic components for the present luminaire, according to one embodiment. The electronic components 300 include driver and control module 310, light source module 320, and touchscreen panel and control 330.

Driver and control module 310 also includes an AC-DC converter 311 that is used to take the input line voltage from the wall socket and convert it into a more manageable voltage output. The AC-DC converter 311 powers the multi-channel dimmable LED driver 312, the microprocessor 313, and the USB chargers 314, according to one embodiment.

Microprocessor 313 controls the interoperation of dimming with the LEDs, the rate of change and control of the LEDs, controlling the touchscreen 331, and working with the accelerometer 334 and temperature sensor 332 to provide protection features. The microprocessor 313 controls and regulates the wireless module 333 (e.g., Wi-Fi, Bluetooth and/or Zigbee). The lower and upper LED array boards (e.g., within lower diffuser and LED array 250 and upper diffuser and LED array 230 respectively) each have a temperature sensor integrated on the board. The microprocessor 313 monitors both the lower and upper LED array boards' temperatures.

Using the sensor, the microprocessor 313 monitors the temperature to ensure a safe operating condition for the LEDs on the LED array board. For example, the temperature is kept below the junction temperature of the LED. According to one embodiment, the upper limit of the temperature sensor range is set to 95 deg C. such that the microprocessor 313 reduces the output current to the overheated LED array board. The temperature limit set on the microprocessor 313 can vary to the extent it is based on the maximum junction temperature of the LED. The junction temperature can vary from one LED manufacturer to another.

If the lower or upper LED array boards' temperatures have exceeded a specified temperature (e.g., 95° C., the microprocessor 313 lowers the output current to the overheated LED array board. Lowering the drive current prevents accelerated degradation of the LEDs on the board. The microprocessor 313 also monitors the ambient air temperature of the luminaire base 120. Using these three data points the microprocessor 313 can determine if the high LED temperatures are due to a component/manufacturing error or if the luminaire 100 is being subjected to an unreasonably high ambient temperature environment.

Driver and control module 310 includes two USB charging receptacles which provide up to 2.1 A on either port and adjusts to the electronic device (e.g., phone or tablet) being charged in the socket.

Driver and control module 310 includes a multi-channel dimmable LED driver 312 that can switch between different channels and dim according to either preset levels or levels desired by the end-user. A constant current source dims and switches between CCTs by changing the delivery of current to different circuits. LED Driver 312 takes the DC down-converted voltage from AC-DC converter 311 and provides a constant current to the four output channels 321-324 and their corresponding LEDs. The LED driver 312 is dimmable and controlled via the microprocessor 313. Although illustrated as a single multi-channel device, LED driver 312 may be a combination of single channel devices.

Electronic components 300 includes light source module 320 that has an LED board having four channels 321-324 to power four banks of LEDs: 5000K (at 90 CRI+), 2700K (at 90+ CRI), 2200K (at 80+ CRI) and Blue LEDs (both royal blue LEDs between 450-470 nm as well as regular blue LEDs between 470-490 nm). As the 2200K LEDs are only used in a dimming condition, the luminous output of the 2200K LEDs are much lower than the luminous output of the 2700K LEDs.

Figure 5:
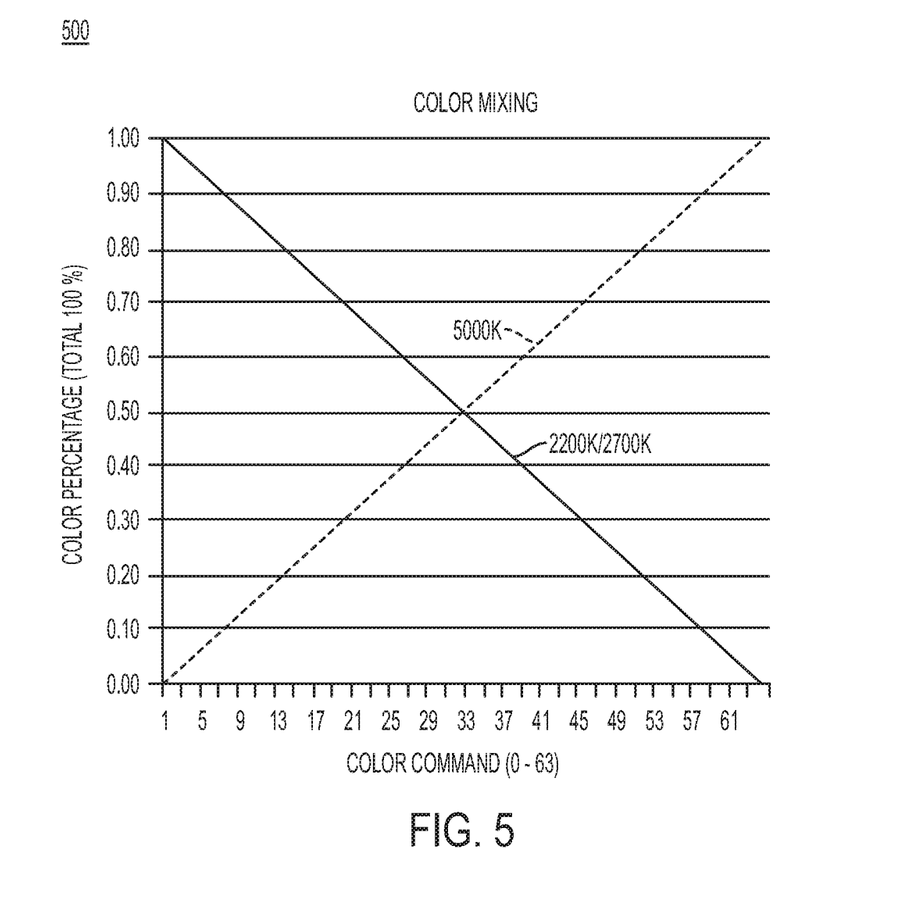
FIG. 5 illustrates an exemplary cool to warm output color transition, according to one embodiment.
Figure 6:
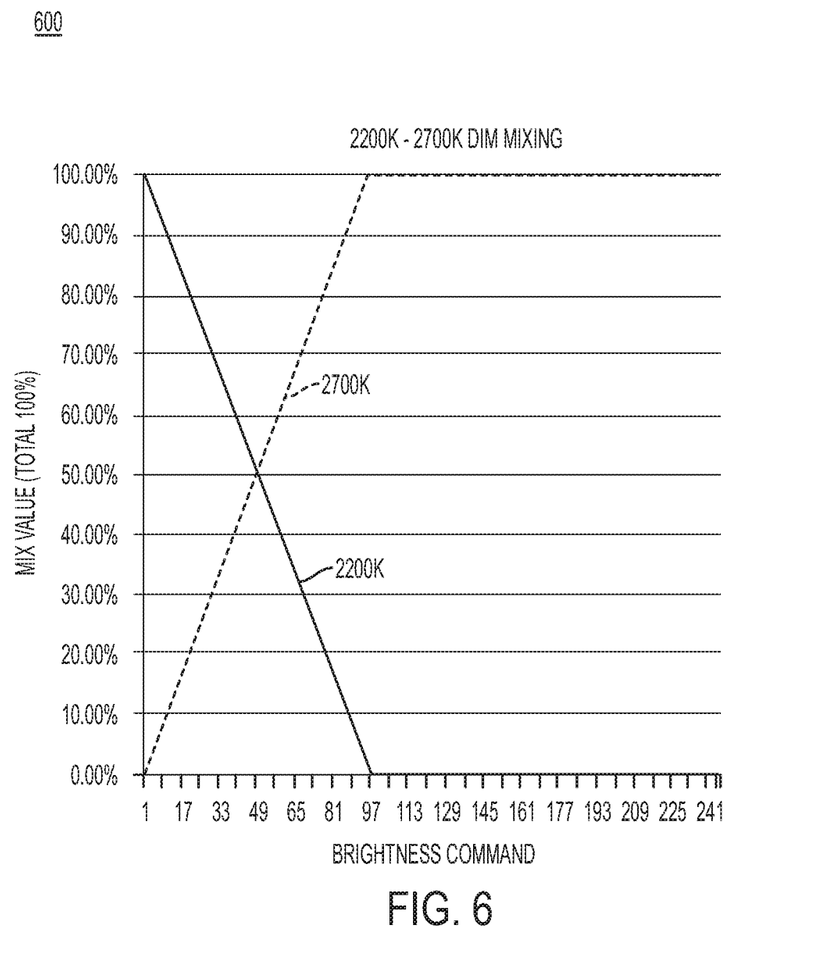
FIG. 6 illustrates an exemplary dimming functionality and color mixing of the present luminaire, according to one embodiment.

The 5000K to 2700K color transition provides color temperatures between the two. One such execution of this transition is shown in FIG. 5. When the lamp 100 is at the warm incandescent lamp type lighting (2700K), the luminaire 100 emits the equivalent of 150 W traditional incandescent bulb at full luminous output. The dimming functionality is set such that at around 800 lumens (approximately a 60 W traditional light bulb), the warm dimming profile is enabled and follows the ratio as shown in FIG. 6.

In the cool white color temperature range, the 5000K bank of LEDs bring the color temperature to approximately 4900-5100K. To allow the light to move to an even cooler color temperature (such as a daylight 6500K CCT or even cooler to 8000K), the bank of blue LEDs is used at a sub 50% intensity profile to move the color temperature over to a user selectable range between 5000K and 6500K or even 8000K.

The luminaire touchscreen control 331 has built in presets and a slider that allows the end-user to customize the light output or use available presets. The microprocessor 313 has been programmed to eliminate the sensitivity of the end-user's finger twitches to allow for a smooth transition between light output levels. The microprocessor 313 eliminates the flitter and flicker that the end-user can introduce into the system due to the GUI/touchscreen 140 oscillating between two values.

A 60-Watt preset button is available on touchscreen 140. The 60-Watt preset button configures the luminaire 100 such that the luminous flux emulates a traditional incandescent light bulb with approximately 800 lumens at 2700K and a CRI greater than or equal to 90.

A 100-Watt preset button is available on touchscreen 140. The 100-Watt preset button configures the luminaire 100 such that the luminous flux emulates a traditional incandescent light bulb with approximately 1600 lumens at 2700K and a CRI greater than or equal to 90.

A work preset button is available on touchscreen 140. The work preset button configures the luminaire 100 so that the color temperature is at approximately 5000K with a high luminous flux of approximately 2600 lumens at a CRI greater than or equal to 90. This color temperature and intensity helps to provide the end-user with light that enriches the environment to allow the user to be more alert and productive.

A sleep preset button is available on touchscreen 140. The sleep preset button activates a sleep mode. An end-user may configure the sleep mode by selecting a time duration that simulates a sunset, moving the light from an existing setting to 2700K (if it is not already at that setting). Once the luminaire 100 is at 2700K, it starts to dim further to 2200K. According to one embodiment, the duration of the sleep cycle can be set by the end-user from between 1 minute and 30 minutes. At the end of the sleep mode, the user can choose to have the light end in either the lowest setting for nightlight mode or end in a completely off state.

Figure 7:
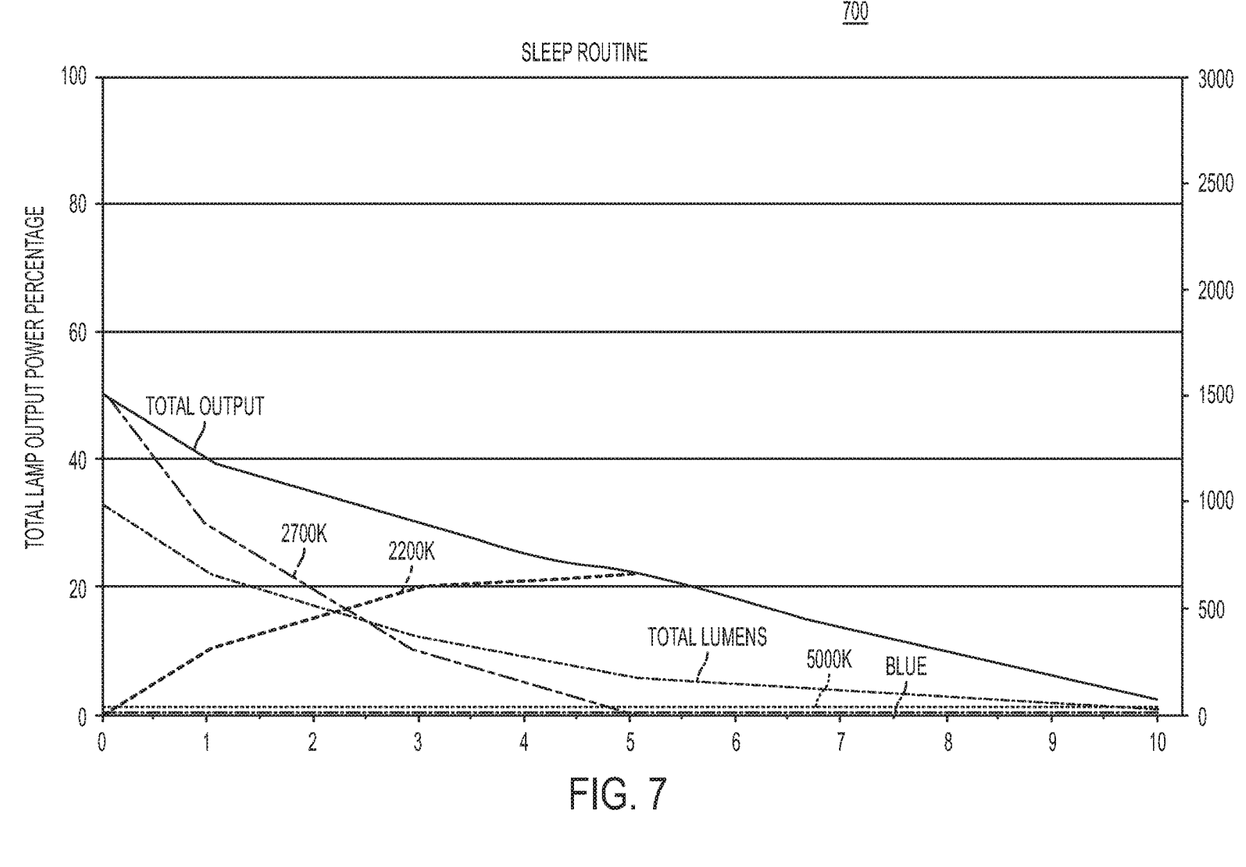
FIG. 7 illustrates an exemplary graph of a sleep mode profile of the present luminaire, according to one embodiment.

A 2200K light source has a very minimal blue wavelength emission. It is the absence of this blue wavelength that allows the body to produce melatonin and help maintain the natural circadian rhythm thus promoting a better night's sleep. FIG. 7 provides a graph of the sleep mode profile including the output of the various LED color temperatures, according to one embodiment. Sleep mode profile 700 is normalized to a 10-minute sleep routine, but can be scaled to whatever the end-user chooses for the sleep cycle duration.

A night light preset button is available on touchscreen 140. The night light preset button is located on an off screen of the luminaire. According to one embodiment, the nightlight has 3 different low light illumination settings that can be cycled through by tapping on the night light icon multiple times. The night light preset button will cycle through from a crescent moon (lowest light output setting) to a half moon (middle light output setting) to a full moon (highest output night light setting). The light output suppresses the blue wavelength at 2200K so as to not interfere with the circadian rhythm of the human body.

Figure 8:
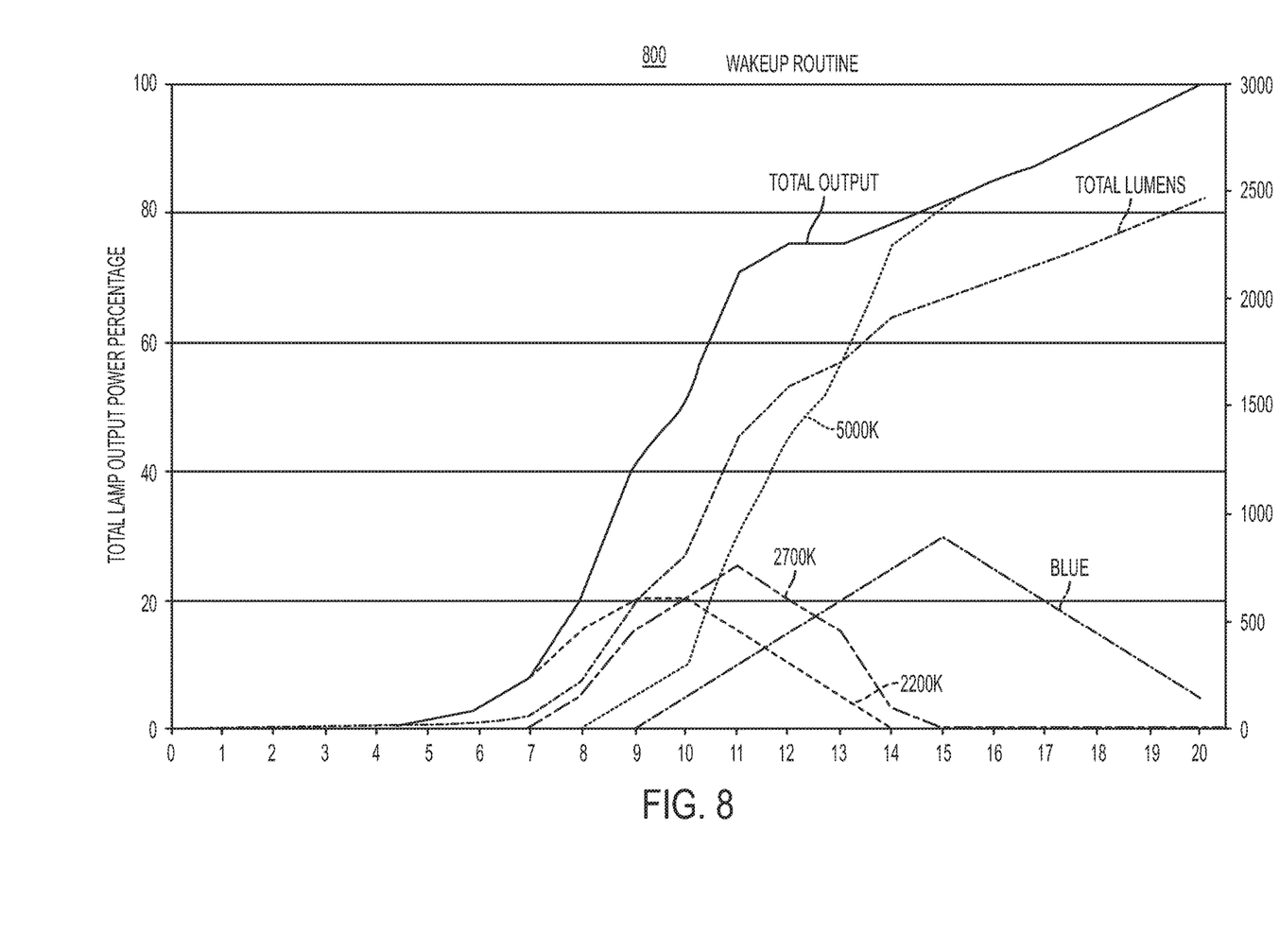
FIG. 8 illustrates an exemplary graph of a wake up profile of the present luminaire, according to one embodiment.

The luminaire 100 features the ability to set an alarm. The alarm features a combination of a light and sound alarm. The end-user can set the alarm from a setting screen on touchscreen 140 to a specific time. Once the alarm is set, a notification symbol is created on the clock above the AM/PM notification. The wake up cycle is set such that it simulates a sunrise starting at 2200K and moves through an output of 2700K up to 5000K. The blue LEDs are added in the wake up cycle to suppress the melatonin secretion and enhance a person's ability to wake out of the sleep stage. A profile of the wake up routine is shown in FIG. 8. The light alarm starts a few minutes before the alarm time is set and continues through to a high intensity white light with blue wavelengths being radiated between 450-490 nm. The alarm also has an audio signal or buzzer to alert the user to wake up.

Touchscreen panel and control 330 includes a tilt sensor 334. The luminaire 100 features a safety mode such that if the luminaire 100 is knocked over, the output of the luminaire 100 is diminished to reduce the heat being generated to the heat source. When the luminaire is tilted beyond approximately 45 degrees, the luminaire drops the intensity to a very low luminous output mode (very close to nightlight mode) which will still provide ambient light such that the user can still see.

The luminaire 100 can operate in a room setting that has additional luminaires operating in a master/slave (remote) configuration. A master luminaire can control an additional 2-8 luminaires, according to one embodiment. The master luminaire has the ability to keep the color in sync (e.g., balancing the color temperatures with all luminaires to maintain the desired color) with the other luminaires. Each of the remote luminaires individually controls its brightness and on/off state, but the color temperature is controlled by the master luminaire. In one embodiment, the remote luminaire can also control the color temperature of the other lamps in the room via the wireless module 333. According to one embodiment, a remote luminaire lacks the touchscreen configuration user interface found in the master lamp and is controlled by electronic or electromechanical switches and/or dials. The master luminaire has a synchronization button on touchscreen 140 to bring the intensity and color temperature of all the luminaires to the same level. Using wireless module 333, the luminaires are paired using wireless technology (e.g., RF, WiFi, Bluetooth, Zigbee, Etc).

The present luminaire 100 allows for pulse width modulation (PWM) based high lumen output with color shifting flicker reduction. PWM dimming in conventional LED lighting is used in a multiple LED channel (N-channels, where N can be any number) all-ON or all-OFF fashion. This introduces two problems:
1. The current demand on the input power supply is higher due to the driving of N-channels simultaneously. This makes the design of the input power supply larger, more costly, and less efficient due to the need to support the total current demand of N-channels at once.
2. The resulting light output of the LED light fixture is all ON or all OFF. This produces a strobe light like effect that can be seen in camera equipment as well as cause physical side effects in humans exposed to the lighting.

Figure 9:
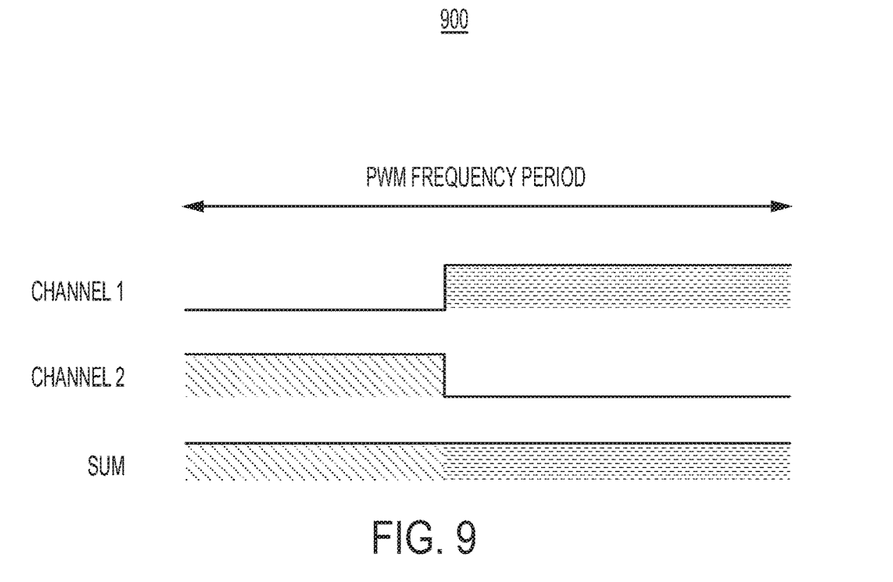
FIG. 9 illustrates using channels of the present luminaire in an out-of-phase configuration to color mix multiple channels, according to one embodiment.

According to one embodiment, by using N-channels in an out-of-phase configuration as illustrated in FIG. 9, luminaire 100 can color mix multiple channels as well as maintain a steady light output across the PWM period. The present luminaire 100 decreases the current demands on the input power supply allowing for a minimized size and optimized efficiency because the system is no longer exposed to multiple stacked N-channel current pulses. The present luminaire 100 allows for a very high lumen output using multiple color temperature LED channels while eliminating the all-ON and all-OFF flicker impact traditional PWM based color mixing produces. This makes it ideal for high output color shifting lighting design. Microprocessor 313 controls the PWM based color mixing process and signals the LED driver 312 for each of the channels 321-324.

Figure 4:
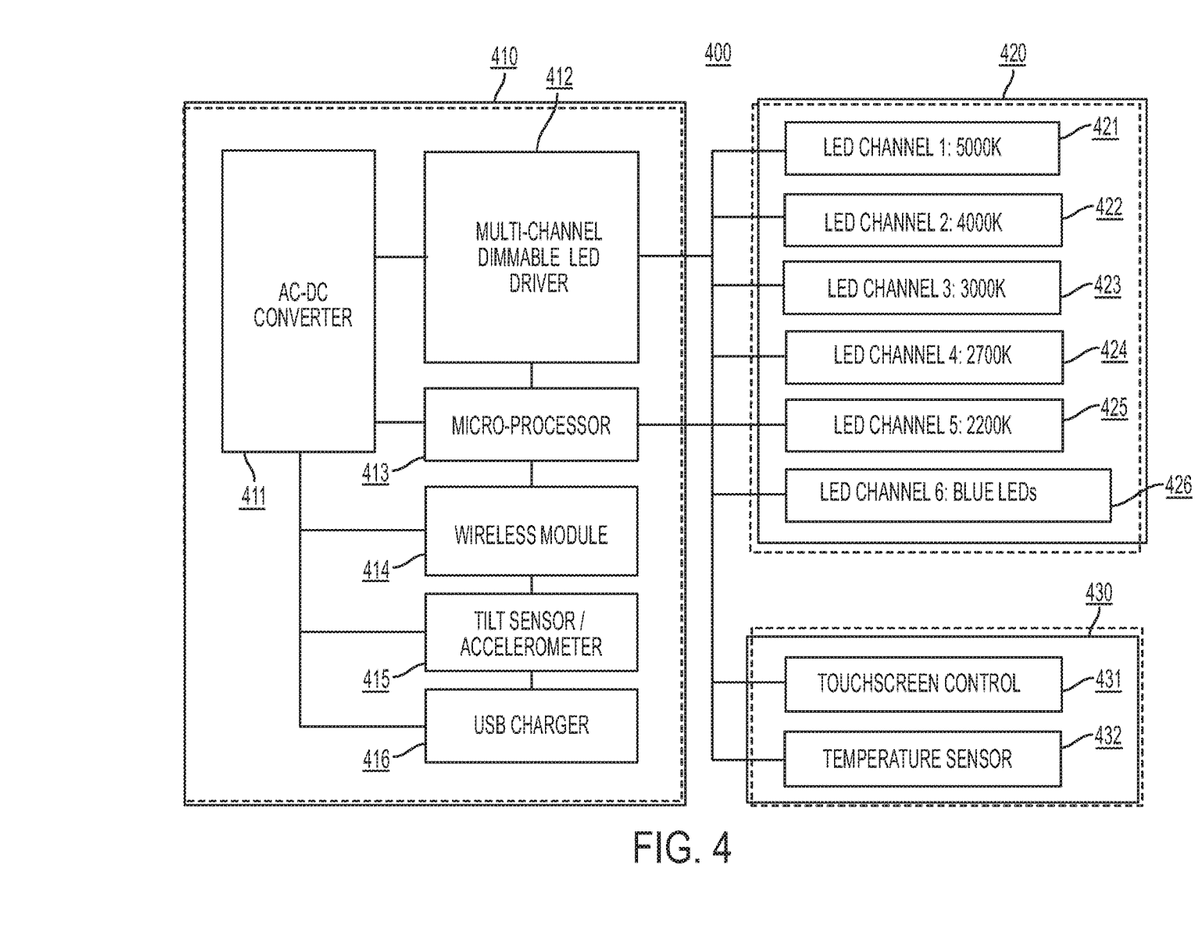
FIG. 4 illustrates an exemplary block diagram of electronic components for the present luminaire, according to another embodiment.

FIG. 4 illustrates an exemplary block diagram of electronic components for the present luminaire, according to another embodiment. The electronic components 400 include driver and control module 410, touchscreen panel and control 430, and light source module 420.

Driver and control module 410 includes a multi-channel dimmable LED driver 412 that can switch between different channels and dim according to either preset levels or levels desired by the end-user. Touchscreen panel and control 430 allows direct control of the light source 130 from the luminaire 100. The luminaire 100 has the ability to retain its previous settings once turned off and turned back on. A constant current source dims and switches between CCTs by changing the delivery of current to different circuits. LED Driver 412 takes the DC down-converted voltage from AC-DC converter 411 and provides a constant current to the 6 output channels 421-426 and their corresponding LEDs. The LED driver 412 is dimmable and controlled via the microprocessor 413.

Driver and control module 410 also includes an AC-DC converter 411 that is used to take the input line voltage from the wall socket and convert it into a more manageable voltage output. The AC-DC converter 411 regulates the multi-channel dimmable LED driver 412, the microprocessor 413, the wireless module 414 and the USB charger 416, according to one embodiment.

The microprocessor 413 is the brains of the luminaire 100, according to one embodiment. Microprocessor 413 controls the interoperation of dimming with the LEDs, the rate of change and control of the LEDs, working in conjunction with the touchscreen 140 operation, and working with the accelerometer 415 and temperature sensor 432 to provide protection features. The microprocessor 413 controls and regulates the wireless module 414 (e.g., Wi-Fi, Bluetooth and/or Zigbee).

The wireless module 414 is part of driver and control module 410, according to one embodiment. Wireless module 414 includes a Wi-fi module, Bluetooth chipset and/or a Zigbee module. Wireless module 414 allows for wireless connectivity and control to the luminaire 100.

Driver and control module 410 also includes an accelerometer 415 that is designed as a protection and safety feature of the luminaire 100. The accelerometer 415 detects when the luminaire 100 has tilted beyond 45 degrees and goes into a low power illumination mode to provide low levels of illumination while reducing the heat and power being distributed to the luminaire 100. Table lamp 100 includes one or more USB chargers 416 for electronic device charging. The USB charger 416 is provided at the base 120 of the luminaire 100 and can provide up to 2.1 A of charging capability for electronic devices, including a tablet and smartphone.

Light source module 420 includes clusters of high power, ceramic-based LEDs (not shown) at different correlated color temperatures (CCTs) (5000K, 4000K, 3000K, 2700K, 2200K). The LEDs provide a high light quality with a color rendering index (CRI) above 90 except for at 2200K, where they will be 80+ CRI. In another embodiment, the luminaire integrates a blue LED to regulate the circadian rhythm. LEDs are placed in both an upward facing and downward facing configuration to provide an omnidirectional look and feel of a traditional table lamp. Optics and/or diffusers from vendors such as Brightview Technologies, Luminit or Fusion Optix are used to blend the light while offering protection from the electronics of the system. There are 6 different channels on the light source module 420 of the luminaire 100. Channel 1 (421), channel 2 (422), channel 3 (423), channel 4 (424), and channel 5 (425) provide for different CCTs (5000K, 4000K, 3000K, 2700K, 2200K, respectively) and channel 6 (426) drives a bank of blue LEDs having a wavelength of approximately 470 nm.

Light source module 420 supports a night light mode that provides dimming control over specific LEDs to provide low levels of ambient illumination at a reduced power consumption. The light source module 420 including the LEDs can survive a dropped impact of up to 5 feet.

Touchscreen panel and control 430 allows for control of luminaire 100, according to one embodiment. Touch screen 140 provides an alarm clock functionality to assist in waking up the end user, not only with an audio cue, but also by illuminating the luminaire 100. An end-user may use touch screen 140 to set the proper light when it is time to sleep to better utilize lighting to adjust the body to the circadian rhythm.

The touchscreen panel and control 430 provides users with a highly controllable yet easy to use luminaire 100 that can add a variety of features. The main use is to control the 6 different channels 421-426 on the light source 130 of the luminaire 100. Touch screen panel and control 430 sets the CCT in a simple manner and controls the color and dimming all through an intuitive user interface. For hotels that offer a turn down service, the luminaire 100 can be adjusted at a touch of the display 140 to provide a comfortable warm environment for the guest/user.

Touchscreen panel and control 430 includes a temperature sensor 432. Temperature sensor 432 provides feedback on the ambient operating temperature of the luminaire 100 in a room.

In another embodiment for hospitality, the luminaire 100 can be turned on and off at check in/check out to offer additional energy savings to the hotel owner through a wireless connection to the luminaire 100. This feature can be overridden by the cleaning and maintenance staff as well to allow for typical operation.

According to one embodiment, the present table luminaire 100 allows the electronic components 300 and 400 (including the light source, driver and control) to be interchangeable with a plurality of bases 120 and shades 110. This provides flexibility for the luminaire 100 to be customizable for a specific look or style.

The present luminaire 100 uses blue LEDs to shift the light correlated color temperature (CCT) beyond the 5000K bank of LEDs to a cooler range (e.g., to 6500K or even to 8000K). In alternate embodiments, the present luminaire 100 mixes the 5000K bank of LEDs with the 2700K bank of LEDs in an out of phase configuration to obtain CCTs between 5000K and 2700K. In yet a further embodiment, the 2200K bank of LEDs are not powered until the luminous output of the 2700K bank of LEDs is at approximately 800 lumens. Luminaire 100 then dims by powering the 2200K bank of LEDs. Warm dimming starts at the equivalent of a 60 Watt incandescent bulb.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a system and method for providing curated content. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

The above example embodiments have been described hereinabove to illustrate various embodiments of implementing an advanced LED luminaire. Various modifications and departures from the disclosed example embodiments will occur to those having ordinary skill in the art. The subject matter that is intended to be within the scope of the disclosure is set forth in the following claims.

What is claimed is:

1. An apparatus, comprising:
   a first LED array that produces a first light in a downward direction, the first LED array having a first diffuser that outputs the first light in a downward direction;
   a second LED array that produces a second light in an upward direction toward the first LED array, the second LED array having a second diffuser facing the first diffuser that outputs the second light in an upward direction toward the first LED array, wherein the second diffuser covers the second LED array and an LED board for the second LED array; and
   a harp between the first LED array and the second LED array that supports the first diffuser, the first LED array and a lamp shade.

2. The apparatus of claim 1 further comprising a first heat sink for the first LED array and a second heat sink for the second LED array, wherein the harp is an additional heat sink for both the first LED array and the second LED array.

3. The apparatus of claim 1, further comprising a multi-channel dimmable LED driver for the first LED array and the second LED array.

4. The apparatus of claim 3, further comprising a microprocessor that controls the multi-channel dimmable LED driver.

5. The apparatus of claim 3, further comprising an accelerometer.

6. The apparatus of claim 3, further comprising a wireless module.

7. The apparatus of claim 3, further comprising a touchscreen display.

8. The apparatus of claim 3, further comprising a USB charger.

9. The apparatus of claim 3, further comprising a temperature sensor.

10. The apparatus of claim 7, further comprising one or more buttons on the touchscreen display for 60 watts, 100 watts, work, wake up, and sleep modes.

\* \* \* \* \*